US009392304B2

(12) United States Patent
Coudurier et al.

(10) Patent No.: US 9,392,304 B2
(45) Date of Patent: Jul. 12, 2016

(54) ENCODING OPTIMIZATION USING QUALITY LEVEL OF ENCODED SEGMENTS

(75) Inventors: Baptiste Coudurier, Los Angeles, CA (US); Eric Buehl, Studio City, CA (US); Robert A. Post, Jr., Marina del Ray, CA (US); Alexander V. Gutarin, Atherton, CA (US)

(73) Assignee: HULU, LLC, Santa Monica, CA (US)

( * ) Notice: Subject to any disclaimer, the term of this patent is extended or adjusted under 35 U.S.C. 154(b) by 650 days.

(21) Appl. No.: 13/408,205

(22) Filed: Feb. 29, 2012

(65) Prior Publication Data

US 2013/0223510 A1 Aug. 29, 2013

(51) Int. Cl.
| H04N 21/234 | (2011.01) |
| H04N 21/2343 | (2011.01) |
| H04N 21/262 | (2011.01) |
| H04N 21/442 | (2011.01) |
| H04N 21/6373 | (2011.01) |
| H04N 21/845 | (2011.01) |
| H04N 19/115 | (2014.01) |
| H04N 19/154 | (2014.01) |
| H04N 19/17 | (2014.01) |

(52) U.S. Cl.
CPC ... *H04N 21/23439* (2013.01); *H04N 21/26258* (2013.01); *H04N 21/44209* (2013.01); *H04N 21/6373* (2013.01); *H04N 21/8456* (2013.01); *H04N 19/115* (2014.11); *H04N 19/154* (2014.11); *H04N 19/17* (2014.11)

(58) Field of Classification Search
CPC .................. H04N 21/23439; H04N 21/26258; H04N 21/44209; H04N 21/8456; H04N 21/6373; H04N 19/17; H04N 19/115; H04N 19/154; H04N 5/76; G11B 20/10527; G11B 20/1217; G11B 27/105; G11B 27/322; G11B 2220/2541; G11B 2020/10944

See application file for complete search history.

(56) References Cited

U.S. PATENT DOCUMENTS

| 6,192,075 B1 | 2/2001 | Jeng et al. |
| 6,298,071 B1 | 10/2001 | Taylor et al. |
| 2003/0007516 A1 | 1/2003 | Abramov et al. |
| 2003/0204519 A1* | 10/2003 | Sirivara et al. ................ 707/101 |

(Continued)

FOREIGN PATENT DOCUMENTS

| JP | 2002-369145 A | 12/2002 |
| KR | 10-2009-0058955 A | 6/2009 |

OTHER PUBLICATIONS

International Search Report dated Jun. 2, 2013 from International Application No. PCT/US2013/025623 filed Feb. 11, 2013.

(Continued)

*Primary Examiner* — Mohammed Jebari
(74) *Attorney, Agent, or Firm* — Fountainhead Law Group PC

(57) ABSTRACT

In one embodiment, a method includes encoding a media file using a variable bitrate encoding algorithm based on a plurality of bitrate ranges to generate a set of encoded segments. For each bitrate range, an encoded segment for each segment of the media file is determined from the set of encoded segments based on a quality level of the encoded segment and each bitrate range. The method then identifies a playlist for each bitrate range including the encoded segment for each segment of the media file that was determined for each bitrate range. At least one playlist includes an encoded segment that was generated based on another bitrate range using the variable bitrate encoding algorithm.

20 Claims, 7 Drawing Sheets

(56) References Cited

U.S. PATENT DOCUMENTS

| | | | |
|---|---|---|---|
| 2008/0052414 A1* | 2/2008 | Panigrahi et al. | 709/246 |
| 2008/0130737 A1* | 6/2008 | Kamariotis et al. | 375/240.01 |
| 2009/0279605 A1* | 11/2009 | Holcomb et al. | 375/240.03 |
| 2009/0282162 A1* | 11/2009 | Mehrotra et al. | 709/233 |
| 2010/0158101 A1* | 6/2010 | Wu et al. | 375/240.01 |
| 2010/0169303 A1* | 7/2010 | Biderman et al. | 707/723 |
| 2011/0122939 A1* | 5/2011 | Ganesan et al. | 375/240.01 |
| 2011/0246616 A1* | 10/2011 | Ronca | H04N 21/26258 709/219 |
| 2011/0246621 A1* | 10/2011 | May, Jr. | H04N 7/17318 709/219 |
| 2011/0246661 A1* | 10/2011 | Manzari | G06Q 30/02 709/231 |
| 2011/0302319 A1* | 12/2011 | Ha et al. | 709/231 |
| 2011/0320287 A1* | 12/2011 | Holt et al. | 705/14.73 |
| 2012/0005368 A1* | 1/2012 | Knittle | 709/235 |
| 2012/0042091 A1* | 2/2012 | McCarthy et al. | 709/231 |
| 2012/0084454 A1* | 4/2012 | Lindquist et al. | 709/231 |
| 2012/0144444 A1* | 6/2012 | Hunt | 725/115 |
| 2012/0147958 A1* | 6/2012 | Ronca et al. | 375/240.16 |
| 2012/0170907 A1* | 7/2012 | Johnson | G11B 20/10527 386/241 |
| 2012/0311174 A1* | 12/2012 | Bichot et al. | 709/231 |
| 2013/0054972 A1* | 2/2013 | Thorwirth | H04N 21/23439 713/176 |
| 2013/0091249 A1* | 4/2013 | McHugh et al. | 709/219 |
| 2013/0145415 A1* | 6/2013 | Major et al. | 725/110 |
| 2013/0163430 A1* | 6/2013 | Gell | H04N 21/23439 370/235 |
| 2013/0166868 A1* | 6/2013 | Jarnikov | H04N 21/23892 711/162 |
| 2014/0025710 A1* | 1/2014 | Sarto | G06F 17/3002 707/823 |

OTHER PUBLICATIONS

International Preliminary Report on Patentability (from a corresponding foreign application), mailed Sep. 19, 2012.

* cited by examiner

ENCODING OPTIMIZATION USING QUALITY LEVEL OF ENCODED SEGMENTS

BACKGROUND

When a media file is published, it is typically encoded at different bitrates to accommodate varying bandwidth conditions. Every bitrate version may be sliced into segments. Each segment may be independently downloaded and played by a client. For every bitrate, a server may publish a set of bitrate playlists (e.g., a consecutive list of segments for a given bitrate) and a master playlist (e.g., a list of available bitrate playlists).

During playback, a client may select each consecutive segment based on available bandwidth. This may be done with the goal of maximizing visual quality (i.e., picking the segment with the highest bitrate), while providing an interruption-free experience (i.e., not picking segments that would take too long to download).

Such basic implementations may be well suited for streaming video that is encoded at Constant Bitrate (CBR). However, CBR is not an optimal way to encode video because different types of video scenes have different bandwidth requirements. For example, some sequences may need fewer bits to be encoded, such as sequences that include little motion. Conversely, some sequences need more bits to be encoded, such as in sequences with a lot of motion. Accordingly, various Variable Bitrate (VBR) encoding algorithms have been introduced. The VBR encoding algorithms vary an amount of output data per segment. That is, some segments may have a higher bitrate than other segments.

The media file may be encoded using VBR encoding algorithms based on different constraints. For example, different bitrate ranges may be used as constraints in encoding the video. For a single segment, each bitrate range used with the VBR encoding algorithm may generate an encoded segment at a different bitrate. For example, using a lower bitrate range as a constraint in the VBR encoding algorithm may produce an encoded segment of a lower bitrate than if a higher bitrate range is used.

After encoding using the VBR encoding algorithm, different bitrate playlists are created where each playlist contains segments from the corresponding encoded version of the media file. That is, each bitrate playlist is limited to the encoded segments that were generated using each specific bitrate range.

SUMMARY

In one embodiment, a method includes encoding a media file using a variable bitrate encoding algorithm based on a plurality of bitrate ranges to generate a set of encoded segments. For each bitrate range, an encoded segment for each segment of the media file is determined from the set of encoded segments based on a quality level of the encoded segment and each bitrate range. The method then identifies a playlist for each bitrate range including the encoded segment for each segment of the media file that was determined for each bitrate range. At least one playlist includes an encoded segment that was generated based on another bitrate range using the variable bitrate encoding algorithm.

In one embodiment, a non-transitory computer-readable storage medium is provided containing instructions for controlling a computer system to be operable to: encode a media file using a variable bitrate encoding algorithm based on a plurality of bitrate ranges to generate a set of encoded segments; determine, for each bitrate range, an encoded segment for each segment of the media file from the set of encoded segments based on a quality level of the encoded segment and each bitrate range; and identify a playlist for each bitrate range including the encoded segment for each segment of the media file that was determined for each bitrate range, wherein at least one playlist includes an encoded segment that was generated based on another bitrate range using the variable bitrate encoding algorithm.

In one embodiment, an apparatus is provided that includes: one or more computer processors; and a computer-readable storage medium comprising instructions for controlling the one or more computer processors to be operable to: encode a media file using a variable bitrate encoding algorithm based on a plurality of bitrate ranges to generate a set of encoded segments; determine, for each bitrate range, an encoded segment for each segment of the media file from the set of encoded segments based on a quality level of the encoded segment and each bitrate range; and identify a playlist for each bitrate range including the encoded segment for each segment of the media file that was determined for each bitrate range, wherein at least one playlist includes an encoded segment that was generated based on another bitrate range using the variable bitrate encoding algorithm.

The following detailed description and accompanying drawings provide a better understanding of the nature and advantages of the present invention.

DETAILED DESCRIPTION

Described herein are techniques for a system to provide virtual playlists. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
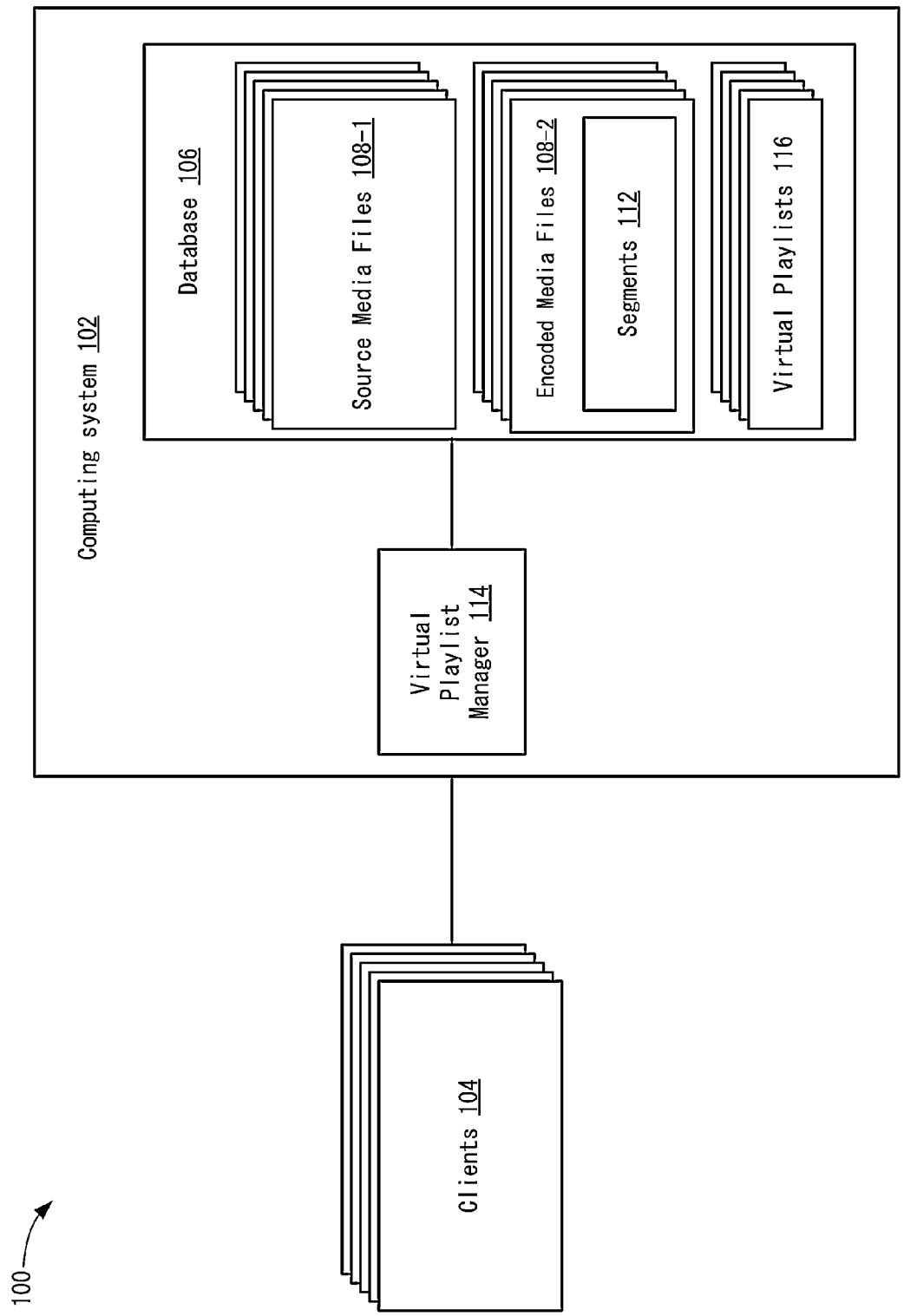
FIG. 1 depicts a system for sending media files to clients using virtual playlists according to one embodiment.

FIG. 1 depicts a system 100 for sending media files 108 to clients 104 using virtual playlists 116 according to one embodiment. System 100 includes a computing system 102 and clients 104. The functions and structures of computing system 102 may be distributed across a computing environment or be found on a single computing machine. Additionally, other structures known in the art, such as communication networks, are not described in detail. Clients 104 may include laptop computers, desktop computers, smartphones, televisions, or other devices capable of downloading media files 108.

Computing system 102 may communicate or stream media files 108 from a database 106 to clients 104. Clients 104 may present the streamed media file 108 to users that may be using a service, such as a streaming video or audio service. The streamed media file 108 may include a video file (e.g., movie, television show, etc.), audio content, or other content.

Database 106 may include source media files 108-1. Source media files 108-1 may be encoded to produce encoded media files 108-2. When media file 108 is referred to, the term may mean a source media file 108-1, encoded media file 108-2, or both. In one embodiment, encoded media files 108-2 are streamed to clients 104. Encoded media files 108-2 include segments 112 that may be a portion of the media file 108. In selected embodiments, segments 112 may be contained within a database 106 as a unit, distinct from media files 108 from which it originated. Alternatively, each segment 112 may be stored in a collection with other segments 112 (e.g., in a collection with all the other segments 112 corresponding to the same media file 108). For example, an encoded media file 108-2 may simply comprise a sequenced collection of the various segments 112. Computing system 102 may send a sequence of segments 112 to clients 104 when a media file 108 is requested.

A virtual playlist manager 114 provides virtual playlists 116 that are used to determine which segments 112 to send to clients 104. As will be described in more detail below, a variable bitrate (VBR) encoding algorithm may be used to encode source media files 108-1 to generate encoded media files 108-2. The variable bitrate encoding algorithm may use various bitrate constraints, such as constant rate factor (CRF), or another method for keeping video quality constant along with other bitrate constraints, such as video buffer verifier (VBV). In one example, the variable bitrate encoding algorithm uses different bitrate ranges to encode source media file 108-1.

As will be described in more detail below, virtual playlist manager 114 identifies virtual playlists 116 based on a quality level and a bitrate constraint for different virtual playlists 116. For example, various virtual playlists at different bitrate ranges may be offered, such as a high bitrate, an intermediate bitrate, and a low bitrate. The different bitrate ranges are provided to account for different bandwidth availability that may occur when streaming segments 112 to clients 104. For example, when available bandwidth to stream segments 112 to clients 104 is high, then a high bitrate virtual playlist 116 may be used to maximize visual quality. However, when available bandwidth to stream segments 112 to clients 104 is low, then a low bitrate virtual playlist 116 may be used. The low bitrate virtual playlist 116 provides segments 112 of a lower bitrate, which are of a lesser visual quality, but take less time to stream to clients 104. Also, bandwidth (e.g., processing availability) of a server that are serving segments 112 to clients 104 may become constrained. For example, the servers may be experiencing high load at certain times due to a high number of requests. Lower bitrate playlists 116 may be used in this case also even though additional bandwidth with respect to a network to send segments 112 to clients 104 is available, such as when load experienced is above a threshold.

Virtual playlists 116 are virtual in that each virtual playlist 116 may include segments 112 that are from different encoded media files 108-2 using different bitrate ranges. Thus, encoded segments 112 are selected for virtual playlist 116 based on a quality level regardless of the bitrate range in which segments 112 were encoded. For example, the intermediate bitrate virtual playlist 116 may include segments 112 that were generated from a variable bitrate encoding using the high bitrate range. In this case, it is determined the encoded segment 112 generated using the high bitrate range has a higher quality (e.g., higher bitrate) than an encoded segment 112 generated using the intermediate bitrate range. As will be discussed in more detail below, the encoded segment 112 that is generated using the high bitrate range may have a bitrate that falls within the intermediate bitrate range, and thus can be used in the intermediate bitrate virtual playlist 116. To illustrate the concept of virtual playlists 116, FIGS. 2A-2C are provided.

Figure 2A:
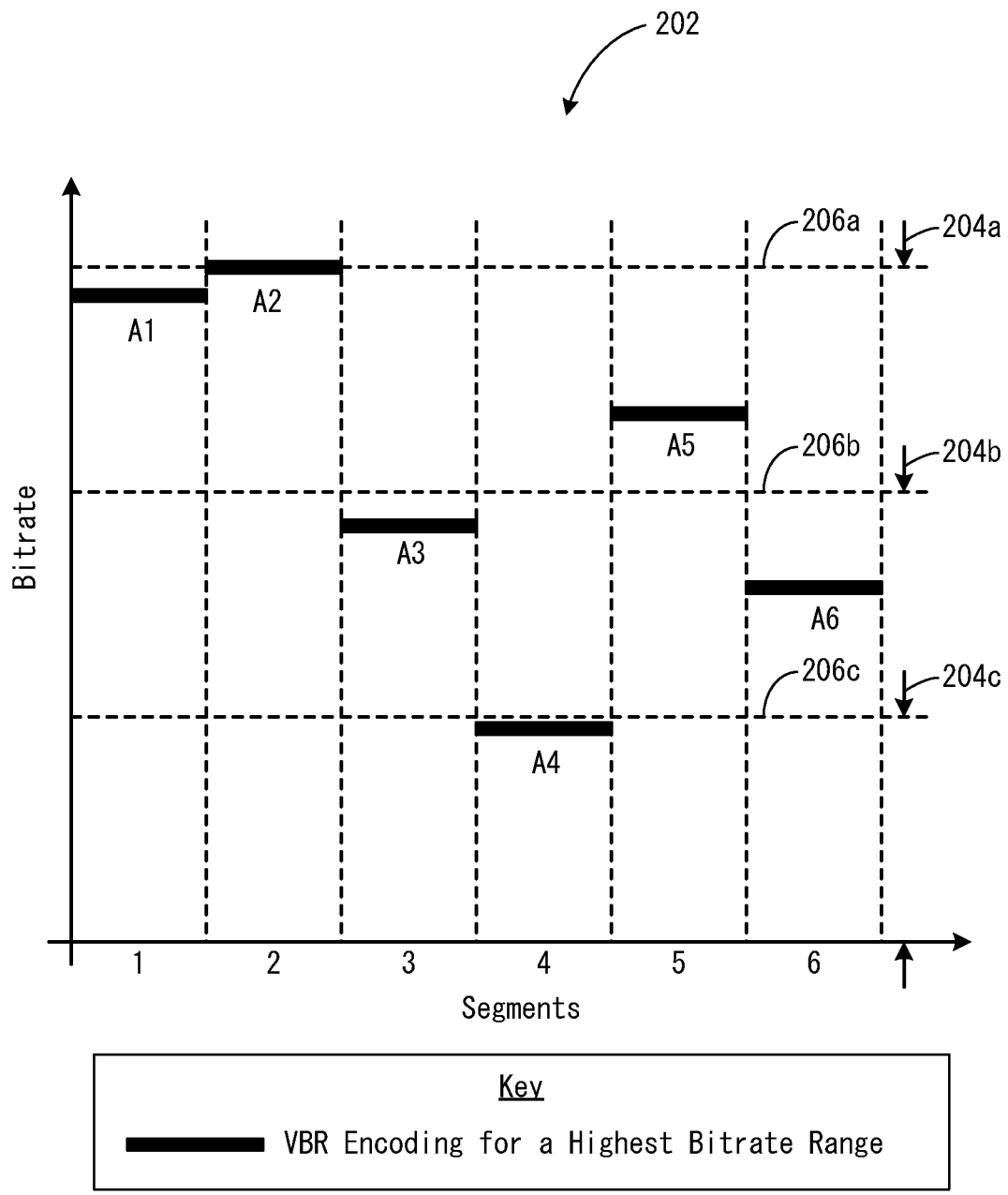
FIG. 2A depicts a schematic graph of a variable bitrate encoding process using a highest bitrate range according to one embodiment.
Figure 2B:
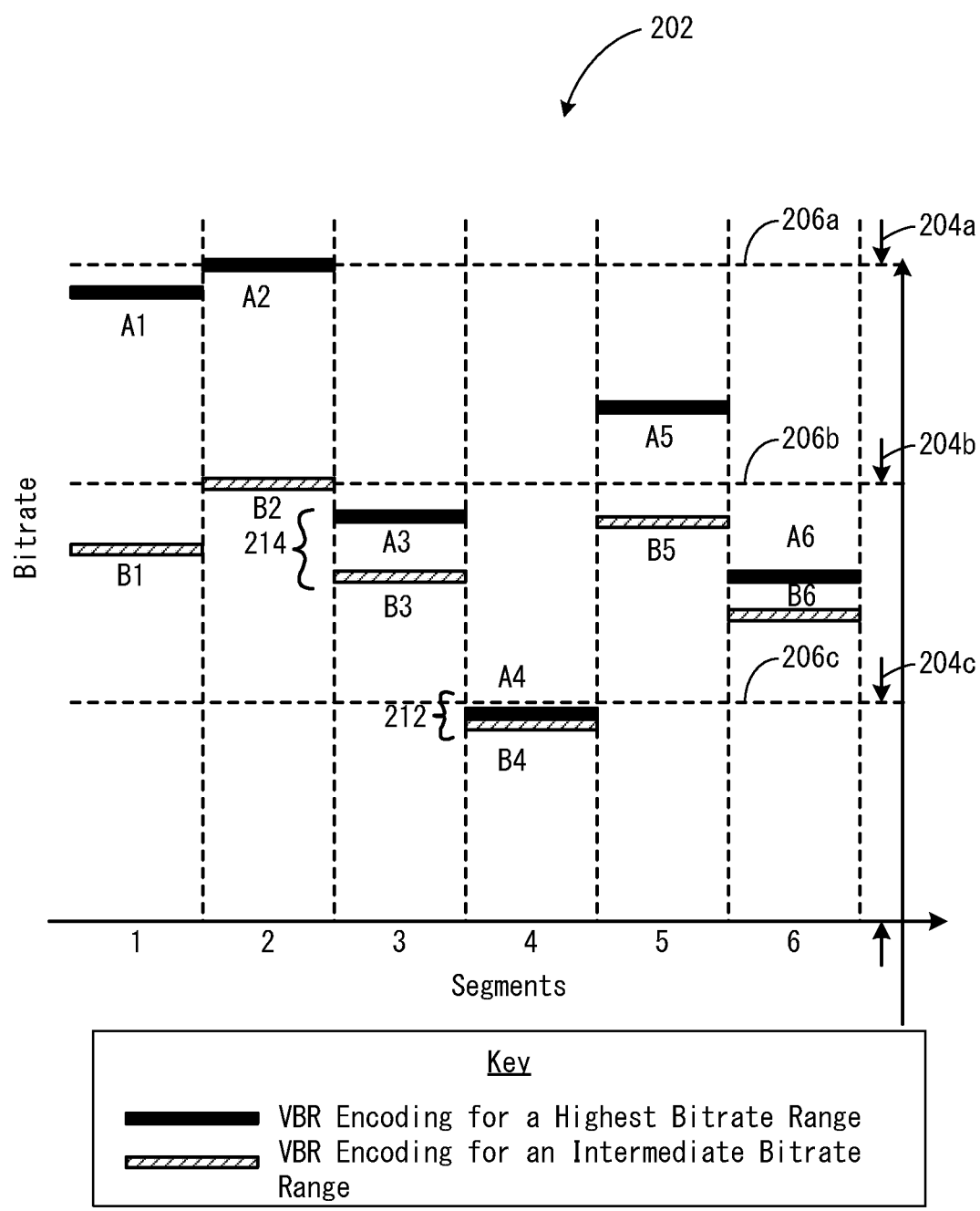
FIG. 2B depicts a schematic graph of a variable bitrate encoding process using an intermediate bitrate range according to one embodiment.
Figure 2C:
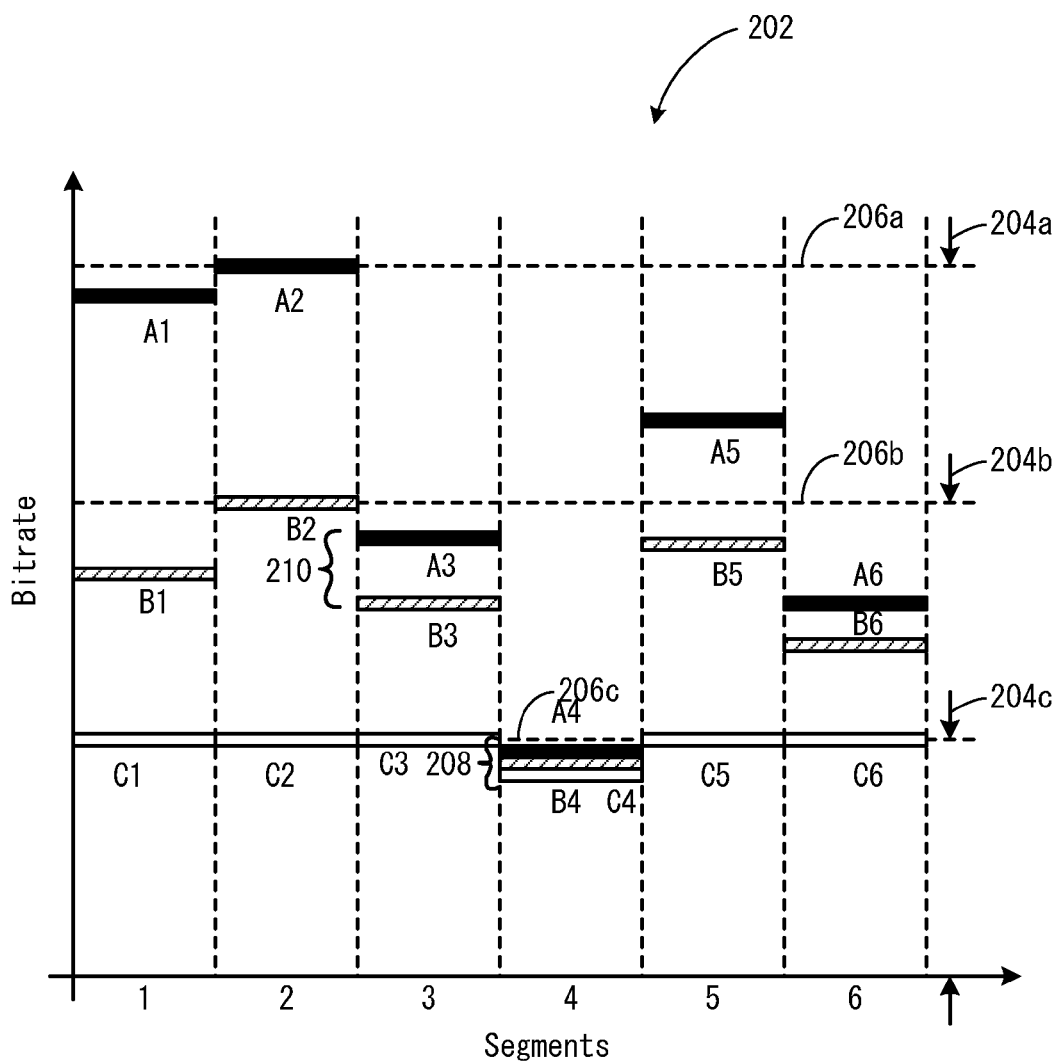
FIG. 2C depicts a schematic graph of a variable bitrate encoding process using a lowest bitrate range according to one embodiment.

Referring to FIG. 2A, a variable bitrate encoding process is explained in further detail through the use of a schematic graph 202. In the encoding process, a source media file 108-1 may be encoded using different bitrate ranges. Each encoded media file 108-2 may be broken up into segments 112. In the illustrated graph 202, a media file 108 has been selected, various segments 112 (six in total) of the media file 108 have been defined, and multiple bitrate ranges 204 (e.g., three in total) have been identified. A highest bitrate range 204a extends up to a highest upper bitrate limit 206a. An intermediate bitrate range 204b extends up to an intermediate upper bitrate limit 206b. A lowest bitrate range 204c extends up to a lowest upper bitrate limit 206c.

In the illustrated graph 202, each segment 112 of media file 108 has been encoded using a VBR encoding algorithm and the highest bitrate range 204a. The resulting encoded segments 112 may be plotted in sequence according to their respective bitrates. The various encoded segments 112 may be sequentially referred to as "A1," "A2," "A3," "A4," "A5," and "A6."

Segments A1 through A6 all have a bitrate less than or equal to the upper limit 206a of the highest range 204a due to using the highest bitrate range 204a as a constraint in the VBR encoding algorithm. While some segments 112 fall within the highest bitrate range 204a, certain segments 112 fall within other bitrate ranges 204 as well. For example, segments A3, A4, and A6 fall within the intermediate bitrate range 204b. Segment A4 also falls within the lowest bitrate range 204c. Accordingly, only a subset of the segments 112 (e.g., segments A1, A2, and A5) may have a bitrate greater than an upper limit 206b of the intermediate bitrate range 204b.

Referring to FIG. 2B, media file 108 has been further encoded using a VBR encoding algorithm and the intermediate bitrate range 204b. The resulting encoded segments 112 may be plotted in sequence according to their respective bitrates. The various segments 112 may be sequentially referred to as "B1," "B2," "B3," "B4," "B5," and "B6." Each segment 112 in this sequence has a bitrate less than or equal to the upper limit 206b of the intermediate bitrate range 204b.

Certain encoded segments 112 may be redundant or unnecessary in view of encoded segments 112 generated previously. For example, segments A3, A4, and A6 all fall within the intermediate bitrate range 204b. Moreover, segments A3, A4, and A6 represent a higher quality product than segments B3, B4, and B6 because the bitrate of segments A3, A4, and A6 are higher than segments B3, B4, and B6. As will be discussed below in more detail, encoded segments B3, B4, and B6 may not be stored for future use. Alternatively, knowing that segments A3, A4, and A6 all fall within the intermediate bitrate range 204b, computing system 102 may avoid even generating encoded segments B3, B4, and B6. That is, computing system 102 may encode only the segments corresponding to a necessary subset (e.g., those corresponding to segments A1, A2, and A5) to form segments B1, B2, and B5.

Thus, computing system 102 may avoid storing encoded segments B3, B4, and B6, avoid generating encoded segments B3, B4, and B6, or both.

Referring to FIG. 2C, media file 108 has been further encoded using a VBR encoding algorithm and the lowest bitrate range 204c. The resulting encoded segments 112 may be plotted in sequence according to their respective bitrates. The various segments 112 may be sequentially referred to as "C1," "C2," "C3," "C4," "C5," and "C6." Each segment 112 in this sequence has a bitrate less than or equal to the upper limit 206c of the lowest bitrate range 204c.

Certain encoded segments 112 may be redundant or unnecessary in view of encoded segments 112 generated previously. For example, segment A4 falls within the lowest bitrate range 204c. Moreover, segment A4 represents a higher quality product than segment C4. Accordingly, encoded segment C4 need not be stored for future use. Alternatively, knowing that segment A4 falls within the lowest bitrate range 204c, computing system 102 may avoid even generating encoded segment C4. That is, computing system 102 may encode only the segments corresponding to a necessary subset (e.g., those corresponding to segments A1, A2, A3, A5, and A6) to form segments C1, C2, C3, C5, and C6, and then use previously encoded segment A4. Thus, computing system 102 may avoid storing encoded segment C4, avoid generating encoded segment C4, or both.

Accordingly, in the illustrated graph 202, at least three virtual playlists 116 may be identified based on a quality level. For example, the quality of segments 112 in a bitrate range 204 may be compared to determine the highest quality segment 112 regardless of the bitrate range 204 used to encode each segment 112. A high bitrate virtual playlist 116 (e.g., a playlist 116 suitable for use when the available bandwidth is relatively high) may contain segments A1, A2, A3, A4, A5, and A6. An intermediate bitrate virtual playlist 116 (e.g., a playlist 116 suitable for use when the available bandwidth is at an intermediate level) may contain segments B1, B2, A3, A4, B5, and A6. A low bitrate virtual playlist 116 (e.g., a playlist 116 suitable for use when the available bandwidth is relatively low) may contain segments C1, C2, C3, A4, C5, and C6.

Intermediate bitrate virtual playlist 116 and the low bitrate virtual playlist 116 both include encoded segments 112 of higher than expected quality. That is, both playlists include segments 112 encoded using the highest bitrate range 204a, and these segments 112 have a higher bitrate than corresponding segments 112 that were encoded using the intermediate bitrate range 204b or the low bitrate range 204c. Specifically, the intermediate bitrate virtual playlist 116 includes segments A3, A4, and A6 and the low bitrate virtual playlist 116 include segment A4. Accordingly, the overall quality of the intermediate bitrate virtual playlist 116 and the low bitrate virtual playlist 116 may be improved due to serving higher bitrate segments 112.

Figure 3:
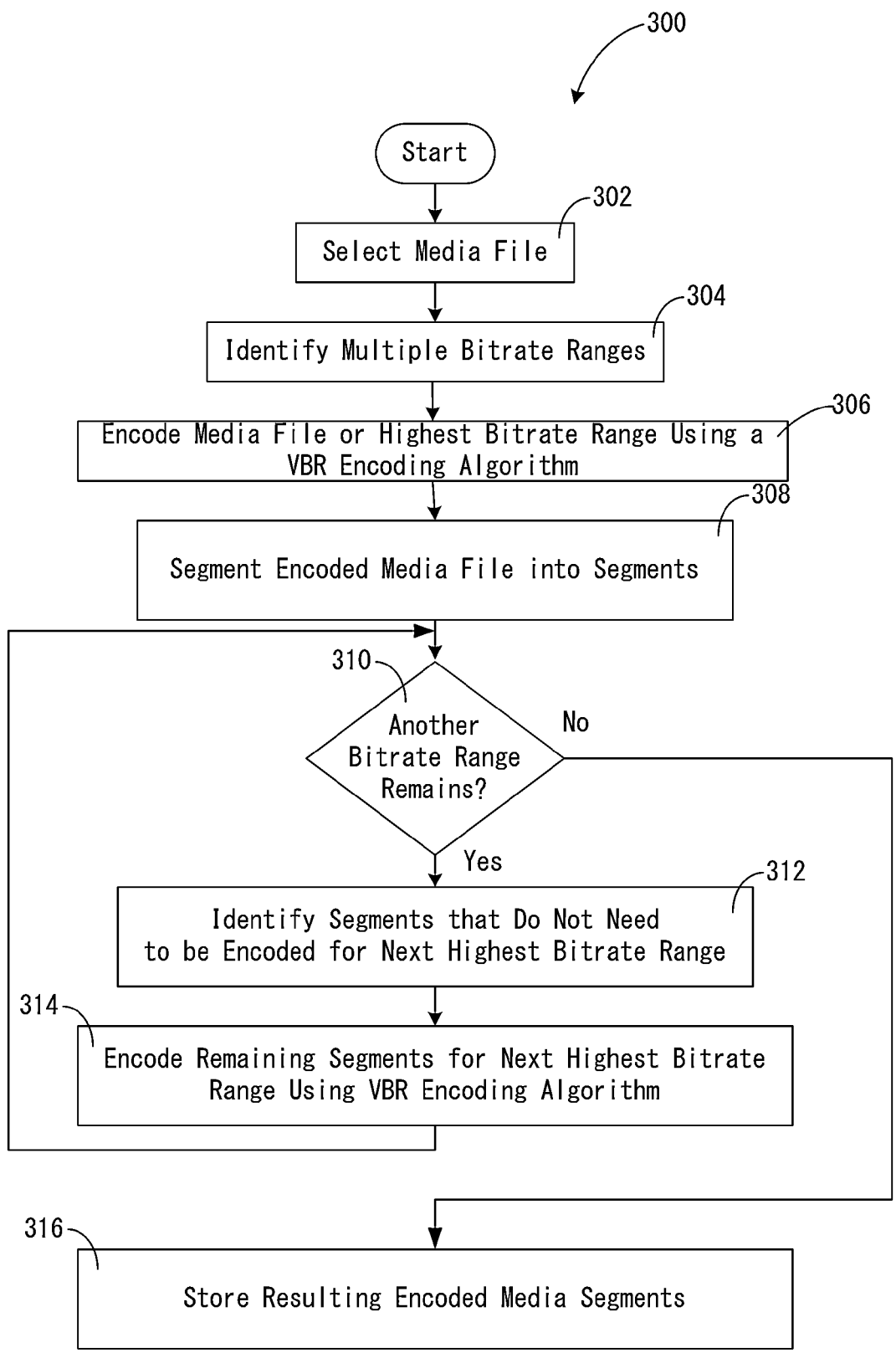
FIG. 3 depicts a simplified flowchart of a method for encoding segments according to one embodiment.

FIG. 3 depicts a simplified flowchart 300 of a method for encoding media files 108 according to one embodiment. At 302, virtual playlist manager 114 selects or obtains a media file 108 (e.g., a source media file 108-1).

At 304, based on the nature of media file 108, nature of typical computer networks, expected variations in bandwidth availability, or the like, multiple bitrate ranges 204 may be identified or defined. In selected embodiments, each bitrate range 204 may correspond to a different bandwidth condition or bandwidth availability and be defined by a different upper bitrate limit 206. For example, a first bitrate range may be the highest range or the range with the highest upper bitrate limit. A second bitrate range may be the next highest range or the range with the next highest upper bitrate limit, and so forth.

At 306, an encoding process may encode media file 108-1 into encoded media file 108-2 for the highest bitrate range using a VBR encoding algorithm. At 308, the encoding process segments encoded media file 108-2 into segments 112.

At 310, before the encoding process concludes, virtual playlist manager 114 determines if another bitrate range remains. If another bitrate range remains, the method continues at 312 to identify any segments 112 that do not need to be encoded for the next highest bitrate range. For example, certain segments 112 encoded to fit within highest bitrate range 204a may fall within a lower bitrate range (e.g., an intermediate bitrate range 204b). Accordingly, it may be unnecessarily redundant to again encode those certain segments 112 to fit within any lower bitrate range. For example, referring to FIG. 2C, at 208, segment B4 and C4 may not need to be encoded once it is determined that segment A4 falls within the lowest upper bitrate range 206c. This is because segment A4 is below the lowest bitrate range 204c and a determination that segment A4 offers the best quality in the lowest bitrate range 204c may be made without encoding segments B4 and C4 (due to segment A4 being encoded using the highest bitrate range 204a). Thus, at 314, the remaining segments 112 (e.g., those remaining after the certain segments 112 have been excluded) may be the only segments 112 encoded for the next highest bitrate range using a VBR encoding algorithm. The process then reiterates to 310 to determine if another bitrate range remains.

If no additional bitrate ranges 204 remain, the encoding process may terminate, and at 316, the resulting encoded media segments 112 may be stored. In one embodiment, segments 112 are stored in database 106 after encoding of all bitrate ranges 204 (the encoded segments 112 may have been stored in memory as the encoding process is performed). The determination of which segments 112 to store may be based on the quality level. For example, the highest bitrate segment in a bitrange range 204 may be stored and other segments 112 in bitrate range 204 are not stored. Referring to FIG. 2C, at 210, segment A3 may be stored and segment B3 is not stored. Segment B3 is not stored because when the intermediate bitrange 204b is requested, segment A3 satisfies the bitrate constraint associated with that bitrate range (i.e., segment A3 is lower than the upper limit 206b of bitrate range 204b). In one example, a threshold may be used to determine when negligible differences exist between segments. For example, at 208, segments A4, B4, and C4 may be around the same bitrate. In one example, if the bitrates of segments are within a threshold of a certain percentage, such as 2% of each other, then a user would not be able to discern the difference. In this case, the lowest bitrate segment may be stored, such as segment C4 is stored in this case instead of segment A4.

In other embodiments, certain segments 112 may not be stored. Referring to FIG. 2B, at 212, segment B4 may not be stored because segment A4 satisfies the lowest bitrate range 204c. Thus, storing of any segments 112 that are generated for the intermediate bitrate range 204b and the lowest bitrate range 204c can be avoided. However, at 214, segment B3 may still be stored because it is the lowest bitrate segment generated so far and may need to be sent if the lowest bitrate range 204c is used (however, a segment 112 for the lowest bitrate range 204c may still be generated).

Accordingly, segments 112 that do not need to be encoded or stored for the next highest bit range may be determined based on the quality level of previously-encoded segments 112. For example, if a segment 112 is encoded and falls within a lower bitrate range (e.g., the next highest bitrate range), that segment 112 may not be encoded again. This is because the quality of the encoded segment 112 for the higher bitrate range may be higher than the quality of an encoded segment 112 for the next highest bitrate range. Additionally, segments 112 are not stored because higher quality segments 112 have been previously encoded.

Figure 4:
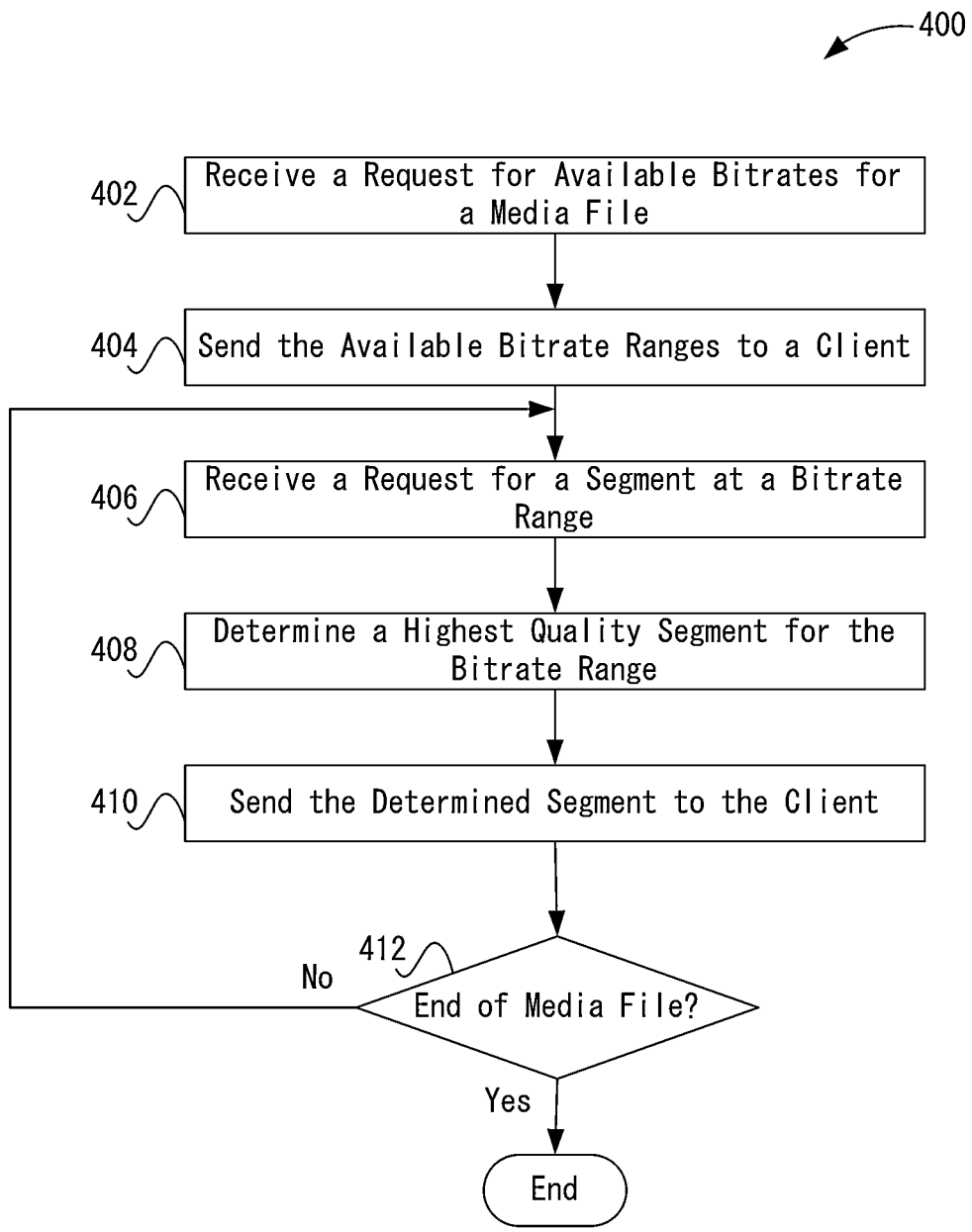
FIG. 4 depicts a simplified flowchart for streaming a media file to a client according to one embodiment.

After encoding, media files 108 may be requested by clients 104. FIG. 4 depicts a simplified flowchart 400 for streaming a media file 108 to client 104 according to one embodiment. At 402, computing system 102 receives a request for available bitrates for a media file 106. The available bitrates may be the highest bitrate range, the intermediate bitrate range, and the lowest bitrate range. At 404, computing system 102 sends the available bitrate ranges to client 104. Client 104 may then select one of the bitrate ranges for streaming segments 112. For example, based on available bandwidth, client 104 selects one of the bitrate ranges that would be appropriate, such as if available bandwidth is high, then highest bitrate range 204a may be selected. Also, client 104 may select the bitrate range for each individual segment 112, groups of segments 112, or for the entire media file 108.

At 406, computing system 102 receives a request for a segment 112 at a bitrate range 204. At 408, virtual playlist manager 114 determines a highest quality segment 112 for the bitrate range. For example, virtual playlists 116 are used to determine the highest quality segment 112 based on the requested bitrate range. In one example, if client 104 requests intermediate bitrate range 204b, intermediate virtual playlist 116 includes segments B1, B2, A3, A4, B5, and A6. When the third segment 112 is served, computing system 102 consults virtual playlist 116 for the intermediate virtual playlist 116, and provides segment A4 to client 104.

In one embodiment, virtual playlists 116 are statically generated. Thus, if the intermediate bitrate range is selected, the intermediate bitrate virtual playlist 116 is consulted to determine the segment 112 to serve. In other embodiments, virtual playlist manager 114 may dynamically determine which segment 112 to provide when the request is received. For example, virtual playlist manager 114 may determine a segment 112 that is stored in database 106 that provides the highest quality that meets the bitrate constraint for the intermediate bitrate range 204b (i.e., a segment 112 that has the highest bitrate that is below the intermediate bitrate upper limit 206b). This segment 112 is determined regardless of the bitrate range that was used to encode this segment 112 using the VBR encoding algorithm.

At 410, computing system 102 sends the determined segment 112 to client 104. At 412, computing system 102 determines if the end of media file 108 has been reached. If not, the process reiterates to 406 where another request from client 104 is received at a bitrate range 204. In some cases, the bitrate range requested may change and computing system 102 consults another virtual playlist 116 to determine a segment 112 to serve. If the end of media file 108 is reached, then the process ends.

Figure 5:
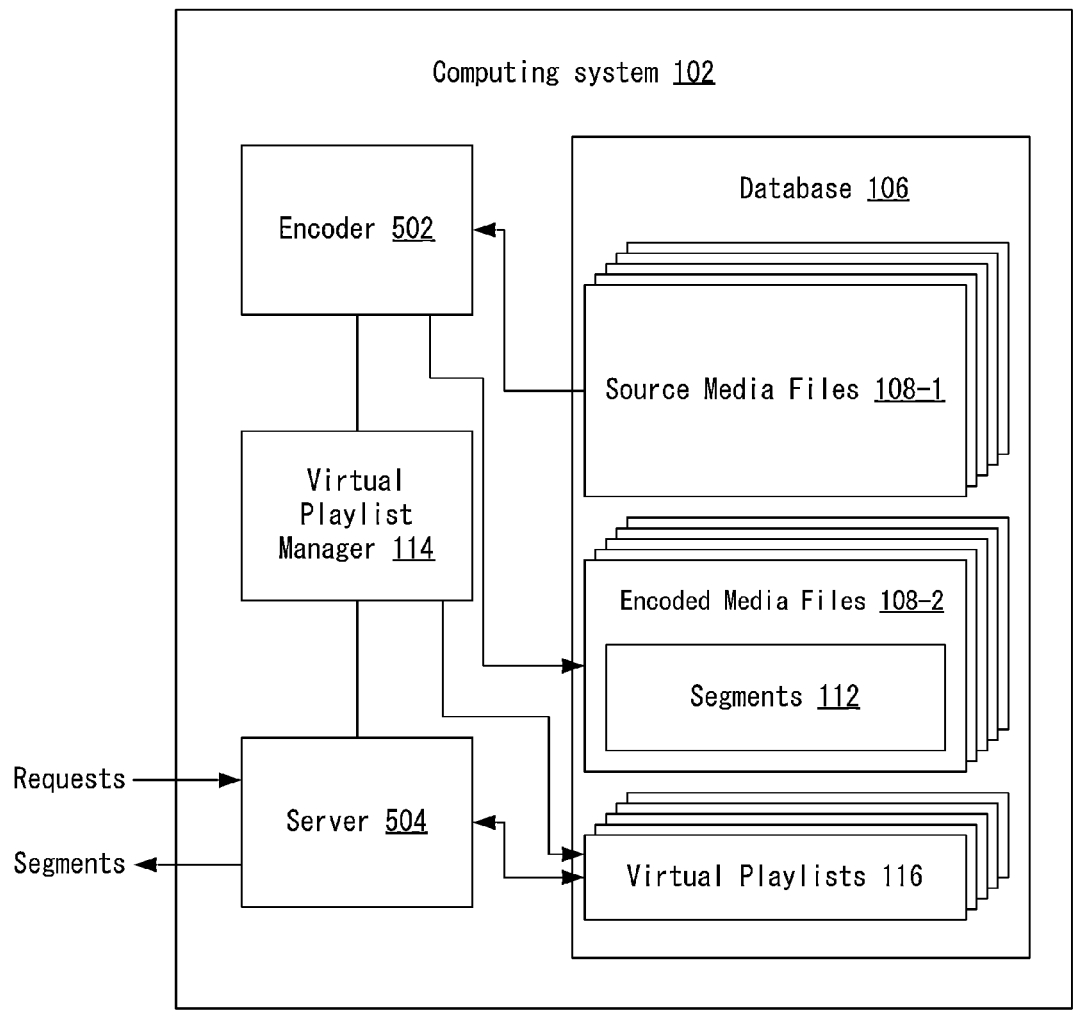
FIG. 5 depicts a more detailed example of computing system according to one embodiment.

FIG. 5 depicts a more detailed example of computing system 102 according to one embodiment. An encoder 502 processes source media files 108-1 to generate encoded media files 108-2. Encoder 502 uses a variable bitrate encoding algorithm to encode source media files 108-1. Encoder 502 stores encoded segments 112 of encode media file 108-2 in database 106. Using particular embodiments, the number of segments 112 that are stored may be reduced. For example, the number of encoded segments 112 stored and served by computing system 102 may be less than the product of the number of bitrate ranges and the number of segments 112. That is, in one example, the number of bitrate ranges is three and the number of segments 112 is six. The product of these two numbers is eighteen. The number of encoded segments stored and served is be fourteen, since encoded segments B3, B4, B6, and C4 may be discarded (or never generated in the first place). Media file 108 may thus be streamed to client 104 at any of the three bitrate ranges 204 exclusively via the fourteen segments 112.

A server 504 receives requests from clients 104 and serves segments 112 to clients 104. In selected embodiments, server 504 may include a bandwidth module. A bandwidth module may characterize the available bandwidth between server 504 and a client 104. Accordingly, using information provided by a bandwidth module, client 104 may better determine which segments 112 to request from server 504.

Server 504, when responding to a request, may use virtual playlist manager 114 to determine which segment 112 to serve. For example, server 504 consults virtual playlists 116 to determine a segment 112 to serve. In other embodiments, a segment 112 may be dynamically determined. In either case, segment 112 is determined based on a quality level.

Accordingly, higher quality segments 112 may be sent to client 104 based on the bitrate range 204 that is requested. Virtual playlist manager 114 provides segments 112 based on a quality level rather than the bitrate range 204 used to encode segments. Thus, virtual playlists 116 provide the ability to serve higher quality segments 112 by not being constrained by the bitrate range 204 used to encode segments 112. This allows segments 112 that are encoded using a different bitrate range 204 than the bitrate range 204 requested by client 104 may be served to provide higher quality segments 112. Additionally, fewer segments 112 may be stored and/or encoded. When multiple versions of a video need to be encoded (e.g., for a mobile device, for a laptop computer, etc.), the saving of storing and encoding segments 112 may be very useful. Also, the serving of higher quality segments 112 provides a better visual user experience.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
  encoding a media file using a variable bitrate encoding algorithm based on a plurality of bitrate ranges to generate a set of encoded segments, wherein a first encoded segment generated by a higher bitrate range has a bitrate that falls within a bitrate range of a lower bitrate range and not the higher bitrate range;

encoding the media file to generate a second encoded segment based on the lower bitrate range using the variable bitrate encoding algorithm;

determining, for each bitrate range, an encoded segment for each segment of the media file from the set of encoded segments based on a quality level of the encoded segment and each bitrate range, wherein the first encoded segment is selected for the higher bitrate range and the lower bitrate range;

storing the first encoded segment and not the second encoded segment in storage based on the determining of the encoded segment for each segment of the media file for each bitrate range; and identifying a playlist for each bitrate range including the encoded segment for each segment of the media file that was determined for each bitrate range, wherein:

a first playlist associated with the lower bitrate range includes the first encoded segment that was generated based on the higher bitrate range using the variable bitrate encoding algorithm, and the first encoded segment is included in a second playlist associated with the higher bitrate range, and the first encoded segment is provided to a client when the client requests the first encoded segment from the first bitrate playlist associated with the lower bitrate and the first encoded segment is provided to the client when the client requests the first encoded segment from the second bitrate playlist associated with the higher bitrate range, the first encoded segment provided for the first bitrate playlist and the second bitrate playlist having a same bitrate.

2. The method of claim 1, wherein the quality level comprises a maximum bitrate achieved for encoded segments generated using at least a portion of the bitrate ranges that satisfies an upper limit of the bitrate range for the playlist.

3. The method of claim 1, wherein:

the second encoded segment includes a lower bitrate than the first encoded segment, and the first encoded segment is selected for inclusion in the first playlist for the lower bitrate range based on the first encoded segment having a higher quality level than the second encoded segment.

4. The method of claim 1, wherein determining comprises:

comparing the bitrate of the first encoded segment with a bitrate of the second encoded segment that was encoded from a same segment of the media file; and selecting between the first encoded segment and the second encoded segment based on which segment has a higher bitrate.

5. The method of claim 1, further comprising:

comparing the bitrate of the first encoded segment to the lower bitrate range to determine if the bitrate of the first encoded segment is below an upper limit for the lower bitrate range; and if the bitrate is below the upper limit for the lower bitrate range, not encoding the media file to generate the second encoded segment corresponding to the first segment based on the lower bitrate range using the variable bitrate encoding algorithm.

6. The method of claim 1, further comprising:

receiving a request from the client for a segment of the media file at a bitrate range in the plurality of bitrate ranges;

identifying an encoded segment for the requested segment based on the quality level of the encoded segment regardless of which bitrate range was used to encode the encoded segment; and sending the encoded segment to the client.

7. The method of claim 6, wherein identifying the encoded segment comprises:

determining a playlist for the bitrate range requested by the client; and determining the encoded segment in the playlist for the requested segment.

8. The method of claim 6, wherein identifying the encoded segment is performed dynamically when the request is received.

9. The method of claim 1, wherein each segment in the playlists for each bitrate range are identified based on the quality level of any encoded segments for the each segment rather than the bitrate range used to generate the encoded segments.

10. The method of claim 1, further comprising:

determining when a load for a server fulfilling requests for segments of the media file is above a threshold; and sending an encoded segment of the lower bitrate range than that requested by a client when the load is above a threshold.

11. A non-transitory computer-readable storage medium containing instructions for controlling a computer system to be configured to:

encode a media file using a variable bitrate encoding algorithm based on a plurality of bitrate ranges to generate a set of encoded segments, wherein a first encoded segment generated by a higher bitrate range has a bitrate that falls within a bitrate range of a lower bitrate range and not the higher bitrate range;

encode the media file to generate a second encoded segment based on the lower bitrate range using the variable bitrate encoding algorithm;

determine, for each bitrate range, an encoded segment for each segment of the media file from the set of encoded segments based on a quality level of the encoded segment and each bitrate range, wherein the first encoded segment is selected for the higher bitrate range and the lower bitrate range;

store the first encoded segment and not the second encoded segment in storage based on the determining of the encoded segment for each segment of the media file for each bitrate range; and identify a playlist for each bitrate range including the encoded segment for each segment of the media file that was determined for each bitrate range, wherein:

a first playlist associated with the lower bitrate range includes the first encoded segment that was generated based on the higher bitrate range using the variable bitrate encoding algorithm, and the first encoded segment is included in a second playlist associated with the higher bitrate range, and the first encoded segment is provided to a client when the client requests the first encoded segment from the first bitrate playlist associated with the lower bitrate and the first encoded segment is provided to the client when the client requests the first encoded segment from the second bitrate playlist associated with the higher bitrate range, the first encoded segment provided for the first bitrate playlist and the second bitrate playlist having a same bitrate.

12. The non-transitory computer-readable storage medium of claim 11, wherein the quality level comprises a maximum bitrate achieved for encoded segments generated using at least a portion of the bitrate ranges that satisfies an upper limit of the bitrate range for the playlist.

13. The non-transitory computer-readable storage medium of claim 11, wherein:
    the second encoded segment includes a lower bitrate than the first encoded segment, and
    the first encoded segment is selected for inclusion in the first playlist for the lower bitrate range based on the first encoded segment having a higher quality level than the second encoded segment.

14. The non-transitory computer-readable storage medium of claim 11, wherein determine comprises:
    compare the bitrate of the first encoded segment with a bitrate of the second encoded segment that was encoded from a same segment of the media file; and
    select between the first encoded segment and the second encoded segment based on which segment has a higher bitrate.

15. The non-transitory computer-readable storage medium of claim 11, further configured to:
    compare the bitrate of the first encoded segment to the lower bitrate range to determine if the bitrate of the first encoded segment is below an upper limit for the lower bitrate range; and
    if the bitrate is below the upper limit for the lower bitrate range, not encoding the media file to generate the second encoded segment corresponding to the first segment based on the lower bitrate range using the variable bitrate encoding algorithm.

16. The non-transitory computer-readable storage medium of claim 11, further configured to:
    receive a request from the client for a segment of the media file at a bitrate range in the plurality of bitrate ranges;
    identify an encoded segment for the requested segment based on the quality level of the encoded segment regardless of which bitrate range was used to encode the encoded segment; and
    send the encoded segment to the client.

17. The non-transitory computer-readable storage medium of claim 16, wherein identify the encoded segment comprises:
    determine a playlist for the bitrate range requested by the client; and
    determine the encoded segment in the playlist for the requested segment.

18. The non-transitory computer-readable storage medium of claim 16, wherein identify the encoded segment is performed dynamically when the request is received.

19. The non-transitory computer-readable storage medium of claim 11, wherein each segment in the playlists for each bitrate range are identified based on the quality level of any encoded segments for the each segment rather than the bitrate range used to generate the encoded segments.

20. An apparatus comprising:
    one or more computer processors; and
    a non-transitory computer-readable storage medium comprising instructions for controlling the one or more computer processors to be configured to:
    encode a media file using a variable bitrate encoding algorithm based on a plurality of bitrate ranges to generate a set of encoded segments, wherein a first encoded segment generated by a higher bitrate range has a bitrate that falls within a bitrate range of a lower bitrate range and not the higher bitrate range;
    encode the media file to generate a second encoded segment based on the lower bitrate range using the variable bitrate encoding algorithm;
    determine, for each bitrate range, an encoded segment for each segment of the media file from the set of encoded segments based on a quality level of the encoded segment and each bitrate range, wherein the first encoded segment is selected for the higher bitrate range and the lower bitrate range;
    store the first encoded segment and not the second encoded segment in storage based on the determining of the encoded segment for each segment of the media file for each bitrate range; and
    identify a playlist for each bitrate range including the encoded segment for each segment of the media file that was determined for each bitrate range, wherein:
    a first playlist associated with the lower bitrate range includes the first encoded segment that was generated based on the higher bitrate range using the variable bitrate encoding algorithm, and the first encoded segment is included in a second playlist associated with the higher bitrate range, and
    the first encoded segment is provided to a client when the client requests the first encoded segment from the first bitrate playlist associated with the lower bitrate and the first encoded segment is provided to the client when the client requests the first encoded segment from the second bitrate playlist associated with the higher bitrate range, the first encoded segment provided for the first bitrate playlist and the second bitrate playlist having a same bitrate.

* * * * *